W. O. STARK.
METALLIC LINK BELTING.
APPLICATION FILED NOV. 29, 1911.
1,146,905.
Patented July 20, 1915.
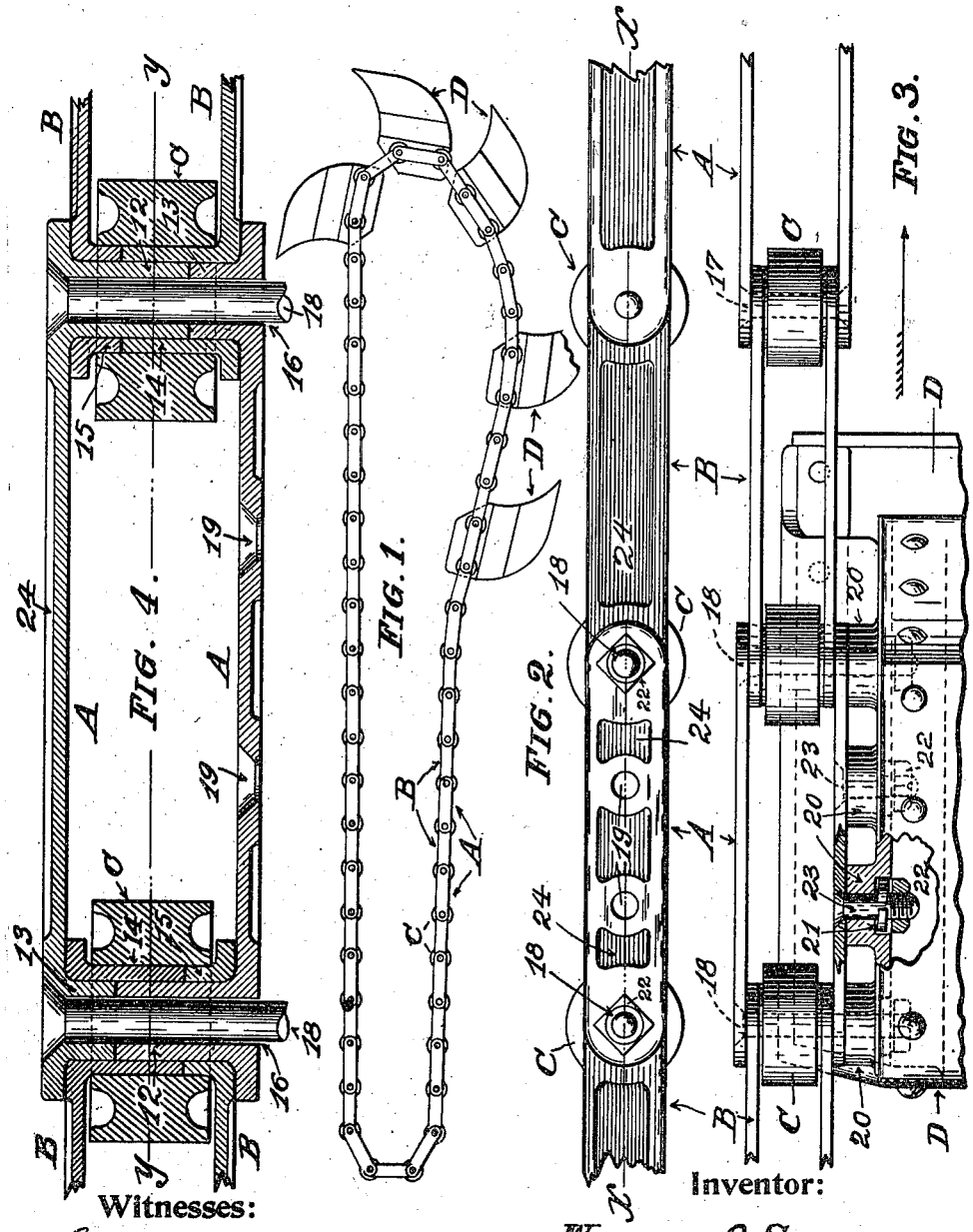
Witnesses:
C. B. Knudsen.
A. G. Peterson.
Inventor:
WILLIAM O. STARK,
By Michael J. Stark & Sons,
Attorneys

UNITED STATES PATENT OFFICE.

WILLIAM O. STARK, OF CHICAGO, ILLINOIS, ASSIGNOR, BY MESNE ASSIGNMENTS, TO BUCYRUS COMPANY, OF SOUTH MILWAUKEE, WISCONSIN, A CORPORATION OF WISCONSIN.

METALLIC LINK BELTING.

1,146,905.  Specification of Letters Patent.  Patented July 20, 1915.

Application filed November 29, 1911. Serial No. 662,999.

*To all whom it may concern:*

Be it known that I, WILLIAM O. STARK, a citizen of the United States, and resident of Chicago, in the county of Cook and State of Illinois, have invented certain new and useful Improvements in Metallic Link Belting; and I do hereby declare that the following description of my said invention, taken in connection with the accompanying sheet of drawings, forms a full, clear, and exact specification, which will enable others skilled in the art to which my invention appertains to make and use the same.

My invention relates generally to improvements in metallic link belts such as are particularly well adapted to use in connection with conveying machinery and has for one object to provide a link belt which may be assembled without any machining operations and which will be operative even in the presence of grit, dust and the like for long intervals of time without lubrication and with a minimum of wear and abrasion. Experience shows that the material best suited for such service as this under such circumstances as these is manganese steel. This is a material which is very hard, which wears smooth and which does not cut even in the presence of grit and the absence of lubrication. This material, however, is one which it is almost impossible to machine and it is necessary, therefore, to provide a belt the component parts of which are so designed that they may be cast in the form in which they are subsequently to be used and may be assembled without machining. A belt adapted to be used under such circumstances as these must be a belt wherein the component parts or links may be removed without changing the length of the belt and in this respect it is differentiated from the well known type of link belts wherein the component links are each integral and are assembled by rotating the links with respect one to the other into abnormal position.

My invention is illustrated diagrammatically in one form in the accompanying drawing, wherein—

Figure 1 is a diagrammatic showing of a conveyer incorporating such a belt; Fig. 2 is a detail side elevation on an enlarged scale of my belt; Fig. 3 is a plan view showing a fragment of a bucket; and Fig. 4 is a section along line 4—4 of Fig. 2.

Like parts are indicated by the same letters throughout the several figures.

My belt comprises a series of alternating outer links A and inner links B pivotally connected at their ends. The chain or belt is, of course, made up of pairs of similar outer and inner links arranged successively, the links of each pair being exactly identical. The outer links A are provided on their opposed ends with bosses or tubular pivots 12, 13 of different lengths. These pivots are held together by the tie pins 18 which pass through them. The inner links have on either end the tubular pivots or bosses 14, 15 of different lengths and of such inner diameter as to fit or engage the pivots 12 and 13. These pivots 14 and 15 are of such length that when in the assembled position as indicated in Fig. 4 they fit snugly between the outer links A, A, that is to say the total length of the pivots 14 and 15 plus twice the thickness of the link B is equal to the total length of the pivots 12 and 13. These links are so assembled that the long pivot 12 projects through the short pivot 15 and therefore the line of cleavage between the pivots of the inner links is at a different point from the line of cleavage between the outer links, thus making these pivots overlap. The result of this is that any tension on the chain is carried by the tubular pivots themselves and the sole function of the tie pin 18 is to hold these links together resisting any separating movement.

A roller C surrounds the outer tubular pivots 14 and 15 to support the links on any suitable belt conveyer track in the usual manner. The links are shown as recessed at 24 for the purpose of decreasing their weight. The pins 18 are provided with conical heads to engage the countersinks in the outer links A so as to make a smooth surface. As indicated in Fig. 3 this pin 18 may have substituted therefor the rivet 17, but when buckets are to be carried on the links the pins 18 extend through the tubular bosses 20 on the buckets D and are provided with nuts 22 and locking washers 21 to hold the buckets in position. The buckets are also fastened to the links by the pins 23 passing through the countersunk holes 19 and links A provided with locking washers 21 and nuts 22. By the arrangement shown the link belt may be drawn over the sprocket wheels in the usual manner, the belt being coupled up before the buckets are attached. The buckets may then be attached without interfering with the belt, those links where the buckets are not to be found being riveted together and those links where the buckets are to be located being bolted as indicated.

As above noted the more or less soft steel bolts or rivets act only as tension members to hold the component parts together and carry none of the usual stress caused by the tension on the chain. It is this stress which would tend to wear down the pivots and this stress is carried by the manganese steel pivots exclusively.

It will be evident that while I have shown in my drawing an operative device, still many changes might be made in size, shape and arrangement of parts without departing materially from the spirit of my invention. I wish, therefore, that my drawing be regarded as in a sense diagrammatic.

Having thus fully described this invention, I claim as new and desire to secure to me by Letters Patent of the United States—

A belt conveyer comprising a succession of two-part, alternate, inner and outer conveyer links made up of pairs of flat, elongated plates having tubular pivot bosses of varying lengths at either end, said bosses being inwardly extending, the longer boss on one plate abutting against the shorter boss on the other and vice versa, the bosses on the inner link surrounding the bosses on the outer, and means for holding the plates altogether against lateral displacement with respect one to the other, said plates and their bosses being so disposed that the longer boss on the outer plate is immediately adjacent to and surrounded by the shorter boss on the inner plate on the same side and vice versa.

In testimony that I claim the foregoing as my invention, I have hereunto set my hand in the presence of two subscribing witnesses.

WILLIAM O. STARK.

Witnesses:
FRIEDA T. LEBERSTEIN,
MICHAEL J. STARK.